(12) United States Patent
Tessier et al.

(10) Patent No.: US 8,613,554 B2
(45) Date of Patent: Dec. 24, 2013

(54) PDC BEARING FOR USE IN A FLUID ENVIRONMENT

(75) Inventors: Lynn P. Tessier, Eckville (CA); John P. Doyle, Calgary (CA)

(73) Assignee: MSI Machineering Solutions Inc. (TC)

( * ) Notice: Subject to any disclaimer, the term of this patent is extended or adjusted under 35 U.S.C. 154(b) by 709 days.

(21) Appl. No.: 12/726,968

(22) Filed: Mar. 18, 2010

(65) Prior Publication Data

US 2010/0237621 A1 Sep. 23, 2010

Related U.S. Application Data

(60) Provisional application No. 61/161,282, filed on Mar. 18, 2009.

(51) Int. Cl.
*F16C 33/02* (2006.01)
*F16C 33/24* (2006.01)

(52) U.S. Cl.
USPC ............ 384/285; 384/203; 384/297; 384/309

(58) Field of Classification Search
USPC .............. 384/129, 191.2, 192, 193, 206, 226, 384/276, 282, 284, 285, 297, 309–312
See application file for complete search history.

(56) References Cited

U.S. PATENT DOCUMENTS

| | | | | |
|---|---|---|---|---|
| 3,887,248 A | * | 6/1975 | Riegler | ........................ 384/206 |
| 4,080,014 A | * | 3/1978 | Riegler et al. | ................ 384/297 |
| 4,914,865 A | * | 4/1990 | Wiand et al. | .................. 451/163 |
| 6,856,036 B2 | * | 2/2005 | Belinsky | ......................... 290/42 |
| 6,957,947 B2 | | 10/2005 | Williams | |
| 7,190,087 B2 | | 3/2007 | Williams | |
| 7,901,137 B1 | * | 3/2011 | Peterson | ........................ 384/92 |
| 2007/0046119 A1 | | 3/2007 | Cooley et al. | |
| 2007/0046120 A1 | | 3/2007 | Cooley et al. | |

OTHER PUBLICATIONS

Thrust and Radial Bearings for Downhole Tools, Dennis Tool Company, last updated Jul. 10, 2007, printed prior to Mar. 18, 2010, p. 1, available at www.dennistoolcompany.com.
US Synthetic Bearings Site, Compact and Robust Design, Copyright 2007, printed prior to Mar. 18, 2010, pp. 1-5, available at www.ussbearings.com.
"New Energy Corporation Inc. announces commercial availability of 25 kW EnCurrent Power Generation System", press release for New Energy Corporation Inc., Jun. 26, 2008, pp. 1-4.
Sweet, "The Road to "Green" Not So Clean", Calgary Technologies Inc., accessed Jul. 6, 2010, pp. 1-2, available at www.sweet-communications.com/BIC-November2008.pdf.

(Continued)

*Primary Examiner* — James Pilkington
(74) *Attorney, Agent, or Firm* — Sheridan Ross P.C.

(57) ABSTRACT

A self-aligning bearing assembly utilizing PDC buttons for forming opposing circumferential arrays of bearing surfaces, is particularly suitable for use in a fluid environment, such as being immersed in flowing water when supporting the rotor of a hydroelectric turbine. One bearing surface is supported for rotation with the rotor. The opposing bearing surface is supported by a spherical joint in a stationary housing. When the rotor is subjected to hydraulic loading, the opposing bearing surface can be tilted to self-align with the rotor axis.

18 Claims, 15 Drawing Sheets

(56) References Cited

OTHER PUBLICATIONS

"Replacing Diesel Generators in Remote Communities with Clean and Renewable Power", New Energy Corp, CETAC-WEST, Technology Demonstration, available prior to Aug. 2008, pp. 1-2.

"Attaining sustainable hydropower, step by step" New Energy Corporation Inc., NRC-IRAP—Innovation leaders—2006, Calgary, Alberta, Nov. 8, 2006, pp. 1-2.

"US Synthetic Corporation a Dover Company, Diamond Radial Bearings", Journal of Petroleum Technology (JPT), Apr. 2009, p. 78.

* cited by examiner

PDC BEARING FOR USE IN A FLUID ENVIRONMENT

CROSS-REFERENCE TO RELATED APPLICATIONS

This application claims the benefit of U.S. Provisional Patent application Ser. No. 61/161,282 filed Mar. 18, 2009, the entirety of which is incorporated herein by reference.

FIELD OF THE INVENTION

Embodiments of the invention are related to bearings used to support a rotatable rotor against radial loading and, more particularly, for bearings used in a fluid environment, such as in a hydroelectric turbine system.

BACKGROUND OF THE INVENTION

Bearings are known to support a rotor against radial loading. When the radial bearings are used in a fluid environment, such as being submerged in the fluid, the fluid may or may not be a lubricating fluid and may contain particulates which enter the gap between bearing surfaces. The fluid environment may cause reduced life of the bearings and ineffective operation thereof.

An example of one such bearing assembly, used in a hydroelectric application, supports a rotor which is connected between turbine blades submerged in a flow of water and a generator at surface, wherein the bearing assembly supports a lower end of the rotor and is fully submerged in the water.

There is a need in industry for improved bearing assemblies which are operative in a fluid environment and which are not subject to failure as a result of the fluid or particulates therein.

SUMMARY OF THE INVENTION

Embodiments of the invention incorporate a spherical joint to permit self-alignment of the bearing assembly with a rotor, such as the rotor of a hydroelectric turbine, as the rotor and the bearing assembly are subjected to hydraulic loading. Use of PDC buttons to form opposing bearing faces results in substantially indestructible bearing surfaces suitable for use in a particulate-laden fluid environment. Bearing assemblies according to embodiments of the invention are light weight and robust.

In a broad concept, a self aligning radial bearing assembly for immersion in a fluid environment comprises: a stationary housing having a bore formed therethrough, a housing axis and an inner concave surface, the bearing housing being adapted for mounting to a stationary support; an outer bearing support housed within the bore of the stationary housing, the outer bearing support having an outer convex surface, an inner bearing surface and a bore formed therethrough, the outer convex surface co-operating with the inner concave surface of the stationary housing for forming a spherical joint therebetween, the inner bearing surface comprising a plurality of radially inwardly extending PDC buttons supported therein; and an inner bearing support, radially and rotationally supported within the bore of the outer bearing support and having an outer bearing surface and a bore formed therethrough, the bore, having a rotor axis, being adapted for co-rotation of a rotor extending therethrough, the inner bearing support being supported by the rotor for co-rotation therewith, the outer bearing surface comprising a plurality of radially outwardly extending PDC buttons supported therein, wherein when the rotor axis deviates from the housing axis, the outer bearing support tilts in the spherical joint.

In embodiments, bearing faces of the radially outwardly extending PDC buttons on the inner bearing support are ground to a cylindrical profile to prevent button lip-to-lip contact when the inner bearing support co-rotates with the rotor. Over time, the bearing faces of the radially inwardly extending buttons of the outer bearing support may wear to a corresponding cylindrical profile.

In another broad concept, a hydroelectric turbine system comprises: a stationary turbine support structure positioned in a flow of power fluid; a turbine positioned within the flow of power fluid for rotation thereby; a generator above a surface of the power fluid; a rotatable rotor connecting between the generator at an upper end and the turbine, supported therealong, the rotor having a rotor axis; and a bearing assembly connected between a lower end of the rotor and the stationary turbine support structure and immersed within the power fluid, the bearing assembly having a stationary housing having a bore formed therethrough, a housing axis and an inner concave surface, the bearing housing being adapted for mounting to a stationary support; an outer bearing support housed within the bore of the stationary housing, the outer bearing support having an outer convex surface, an inner bearing surface and a bore formed therethrough, the outer convex surface co-operating with the inner concave surface of the stationary housing for forming a spherical joint therebetween, the inner bearing surface comprising a plurality of radially inwardly extending PDC buttons supported therein; and an inner bearing support, radially and rotationally supported within the bore of the outer bearing support and having an outer bearing surface and a bore formed therethrough, the bore, having a rotor axis, being adapted for co-rotation of a rotor extending therethrough, the inner bearing support being supported by the rotor for co-rotation therewith, the outer bearing surface comprising a plurality of radially outwardly extending PDC buttons supported therein, wherein when the rotor axis deviates from the housing axis, the outer bearing support tilts in the spherical joint.

Advantageously, the PDC buttons provide substantially indestructible bearing faces which are not prone to damage as a result of particulates in the fluid environment.

Bearing assemblies according to embodiments of the invention are lightweight and robust, the bearing surfaces having a long life.

DETAILED DESCRIPTION OF THE PREFERRED EMBODIMENT

Embodiments of the invention incorporate a spherical joint to permit self-alignment of the bearing assembly with a rotor of a turbine, as the rotor and the bearing assembly are subjected to hydraulic loading. Use of PDC buttons, for forming opposing circumferential arrays of bearing surfaces, results in substantially indestructible bearing surfaces suitable for use in a particulate-laden fluid environment.

Figure 1:
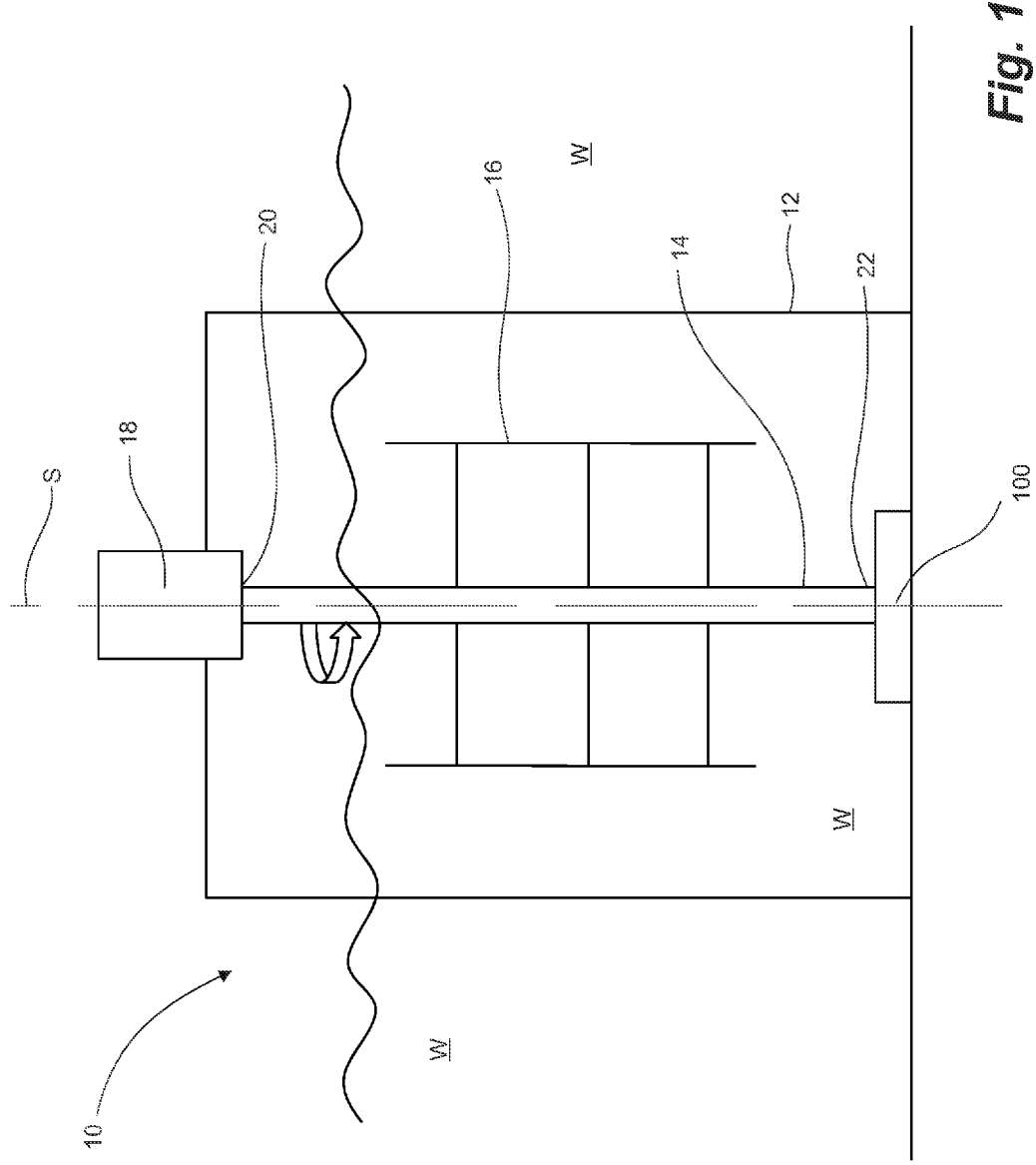
FIG. 1 is a schematic illustrating a bearing assembly, according to an embodiment of the invention in use in a hydroelectric application, the bearing being immersed in a moving stream of water.
Figure 2:
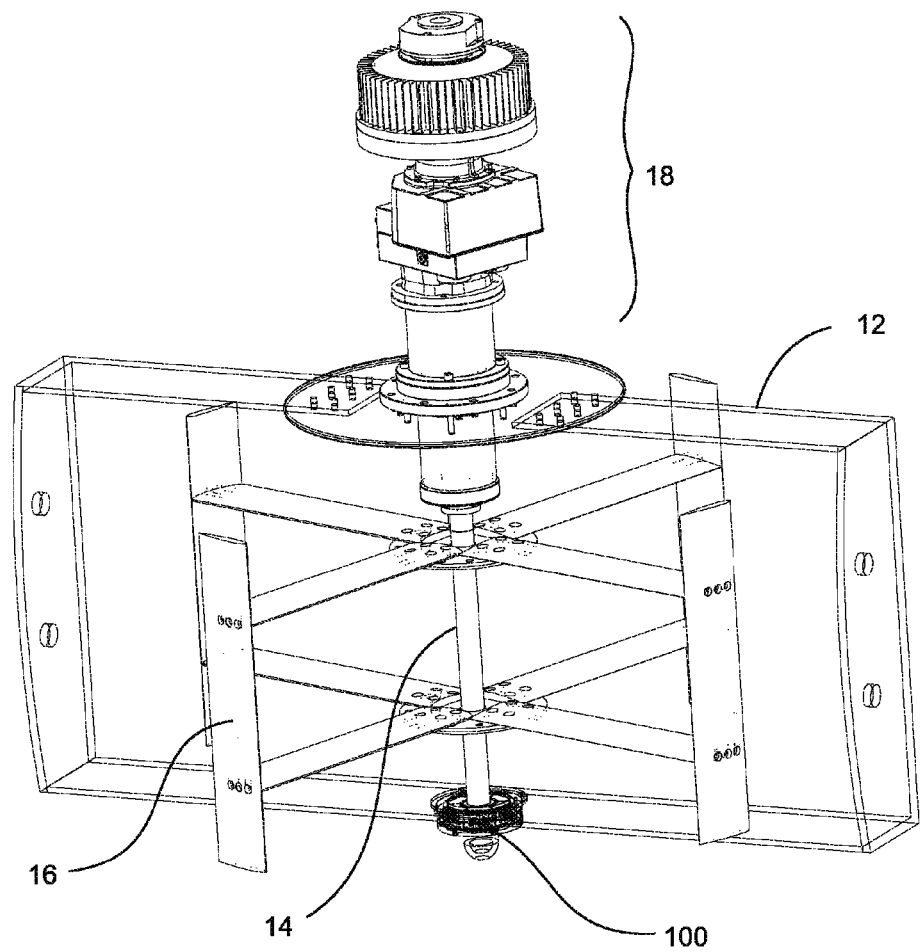
FIG. 2 is a perspective view according to FIG. 1, illustrating the immersed bearing assembly according to an embodiment of the invention.
Figure 3:
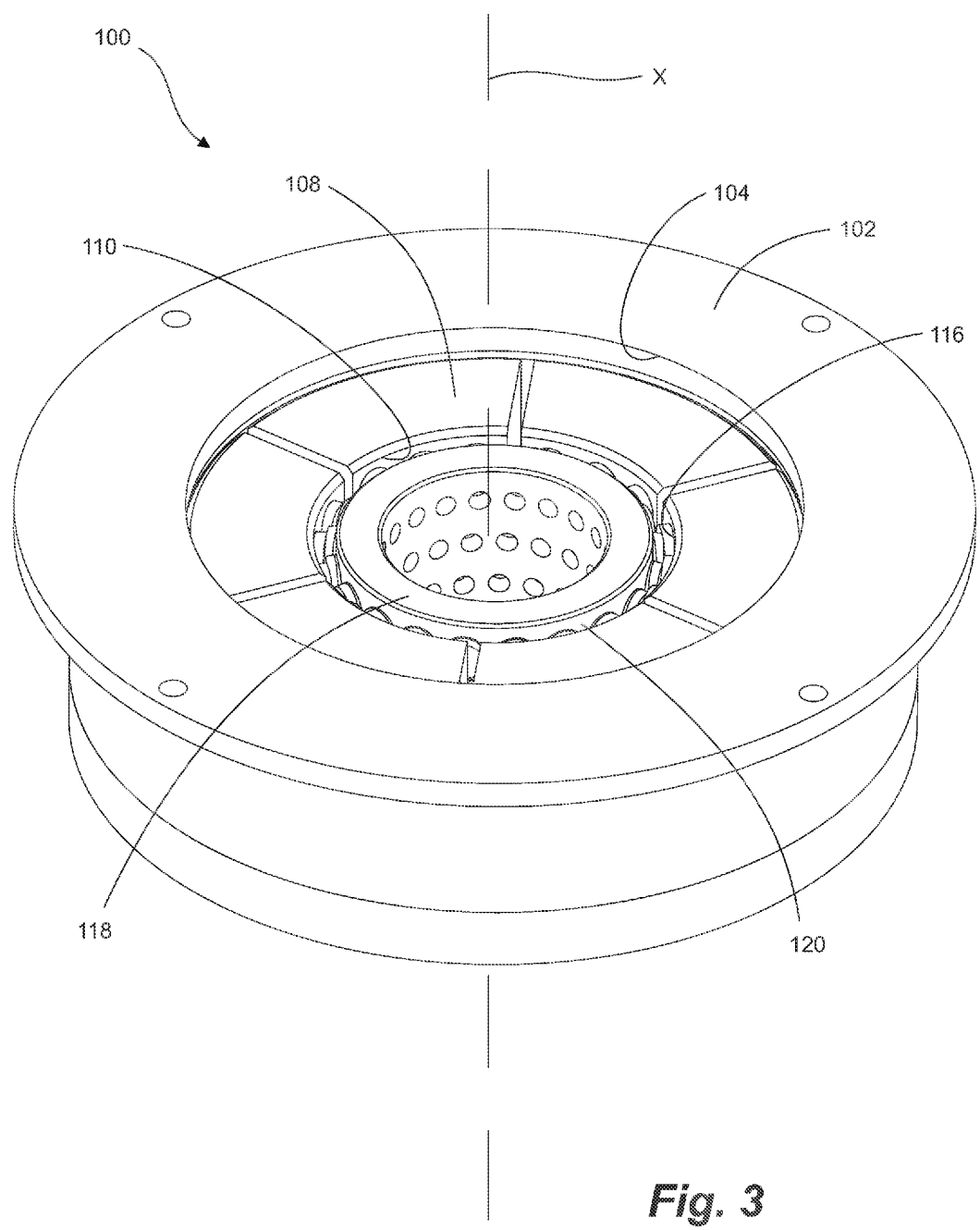
FIG. 3 is a perspective view of a bearing assembly, such as that illustrated for FIG. 2; housed in an axial, split bearing housing.

Having reference to FIGS. 1 and 2, bearing assemblies according to embodiments of the invention are ideal for use in a fluid environment which has sub-optimal lubrication qualities or contains contaminants which are otherwise hostile to conventional bearings. One such environment is in a hydroelectric turbine system.

As shown, the hydroelectric turbine system 10 comprises a stationary turbine support structure 12 which typically supports the hydroelectric turbine system 10 within a suitable flow of power fluid, such as water W flowing in a penstock, sluice gate or the like. A rotor 14, having a rotor axis S, rotatably connects a turbine 16, supported therealong and submerged in the flow of water, with a generator 18 connected at an upper end 20, positioned above surface. The rotor 14 is radially and axially supported at the upper end 20 by an upper, conventional bearing assembly (not shown). A bearing assembly 100 according to an embodiment of the invention is connected between a lower end 22 of the rotor 14 and the support structure 12. The turbine 16 and bearing assembly 100 are fully immersed in the power fluid to permit the turbine 16 to be rotated by the flow of water, as is known in the art.

Having reference to FIGS. 3-6, and in an embodiment of the invention, the bearing assembly 100 comprises a tubular bearing housing or stationary housing 102 having a bore 104 formed therethrough and a housing axis X. An outer bearing support 108 and an inner bearing support 118 are supported in the stationary housing 102. As shown in FIG. 1, the inner bearing support 118 is rotatably supported on the lower end 22 of the rotor 14 for co-rotation therewith.

The outer bearing support 108, having a bore 110 formed therethrough is supported concentrically within the bearing housing's bore 104. The outer bearing support 108 comprises an outer convex surface 112. The bearing housing 102 further comprises an inner concave surface 106 at the bore 104. The outer convex surface 112 co-operates with the inner concave surface 106 on the bearing housing 102 for forming a spherical joint 114 therebetween. The spherical joint 114 permits angular or tilting movement of the outer bearing support 108 relative to the stationary housing 102 for adjusting the alignment of the outer bearing support 108 within the stationary housing 102 in reaction to radial loading of the rotor 14 and resultant changes in the rotor axis S. The outer bearing support 108 further comprises an inner bearing surface 116. The inner bearing surface 116 is generally cylindrical, having a center about the rotor axis S.

The inner bearing support 118 is rotatably supported concentrically within the bore 110 of the outer bearing support 108. The inner bearing support 118 has an outer bearing surface 120 which engages the inner bearing surface 116 of the outer bearing support 108 as the rotor 14 and inner bearing support 118 co-rotate. The outer bearing surface 120 is also cylindrical, having a centre about the rotor axis S.

The inner and outer bearing supports 108,118, arranged concentrically, are positioned axially relative to one another to ensure axial engagement of the opposing outer and inner bearing surfaces 120,116 thereof. The inner and outer bearing supports 108,118 provide structure for affixing to the rotating and stationary components of apparatus implementing the bearing assembly 100. Typically, the rotor 14 of the apparatus is supported axially, such as by thrust bearings (not shown), for axial positioning of the inner bearing support 108 relative to the outer bearing support 108.

Figure 7:
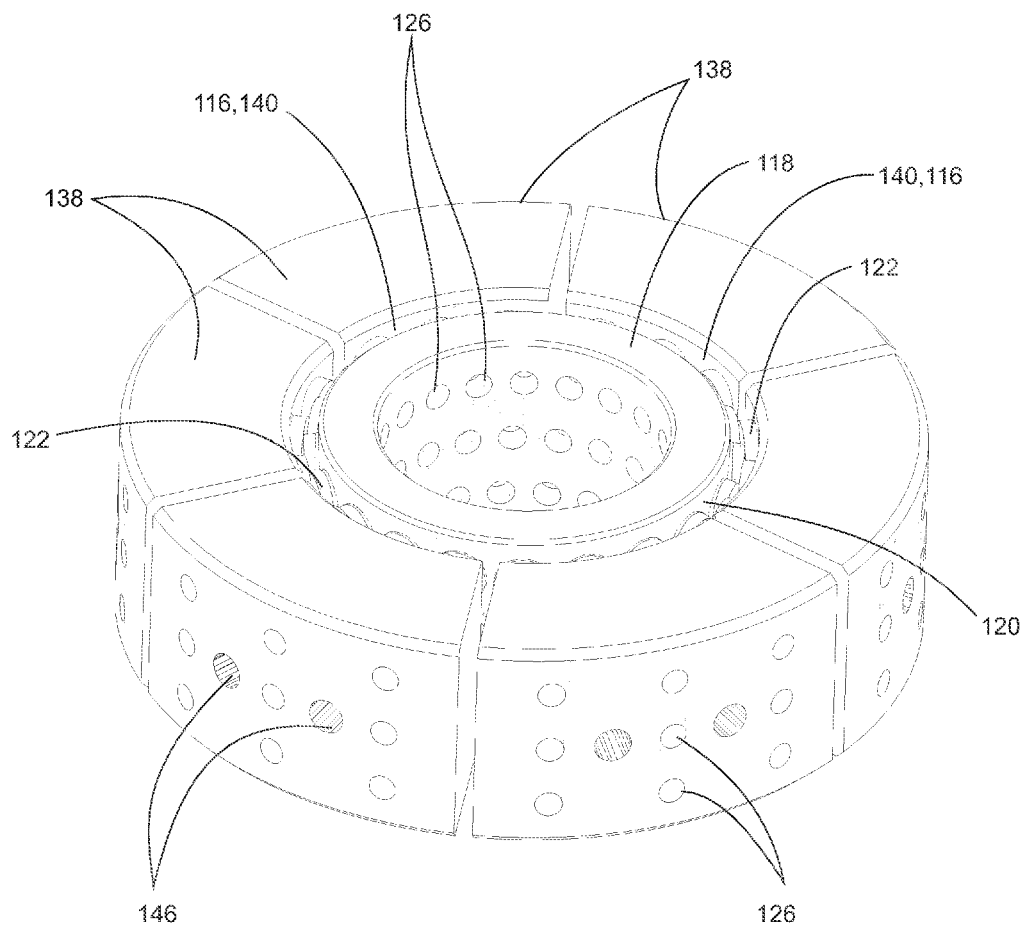
FIG. 7 is a perspective view according of the bearing assembly according to FIG. 3, the bearing housing a portion of the outer bearing support being removed to view bearing surfaces of inner and outer bearing supports.
Figure 8:
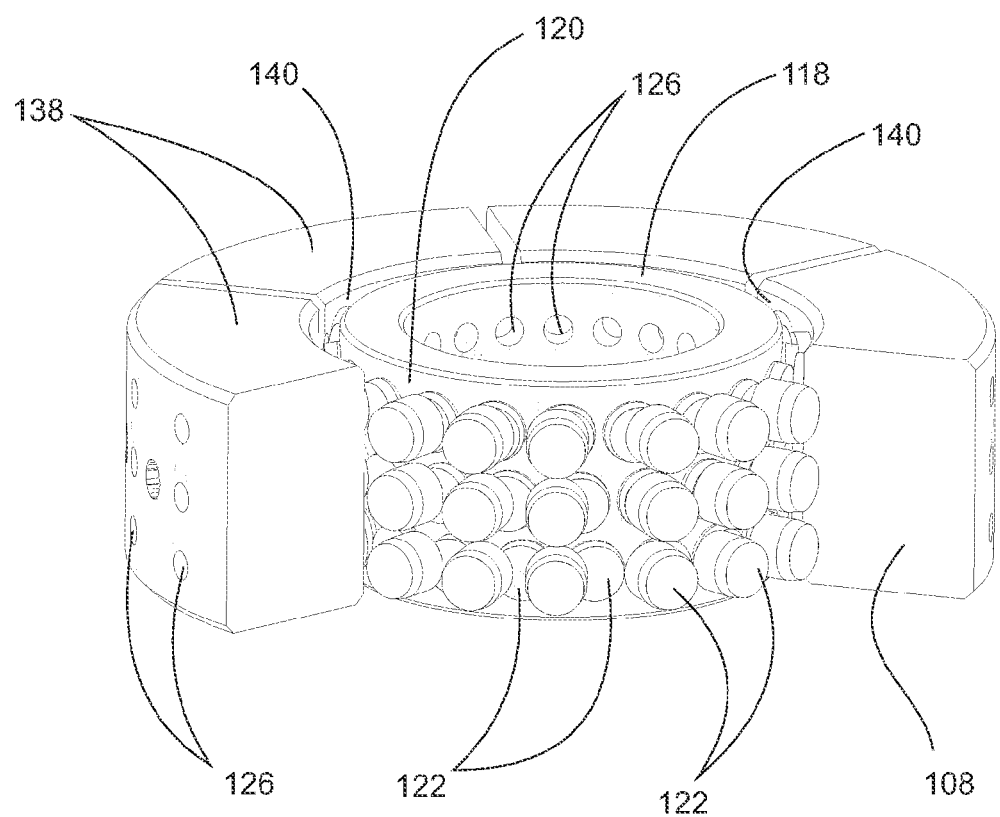
FIG. 8 is perspective view according to FIG. 7, several stationary pad segments which form the portion of the outer bearing support having been removed for illustrating remaining polycrystalline diamond compact (PDC) buttons, from the removed segments, engaging PDC buttons on an inner bearing support supported for rotation within the outer bearing support.
Figure 9:
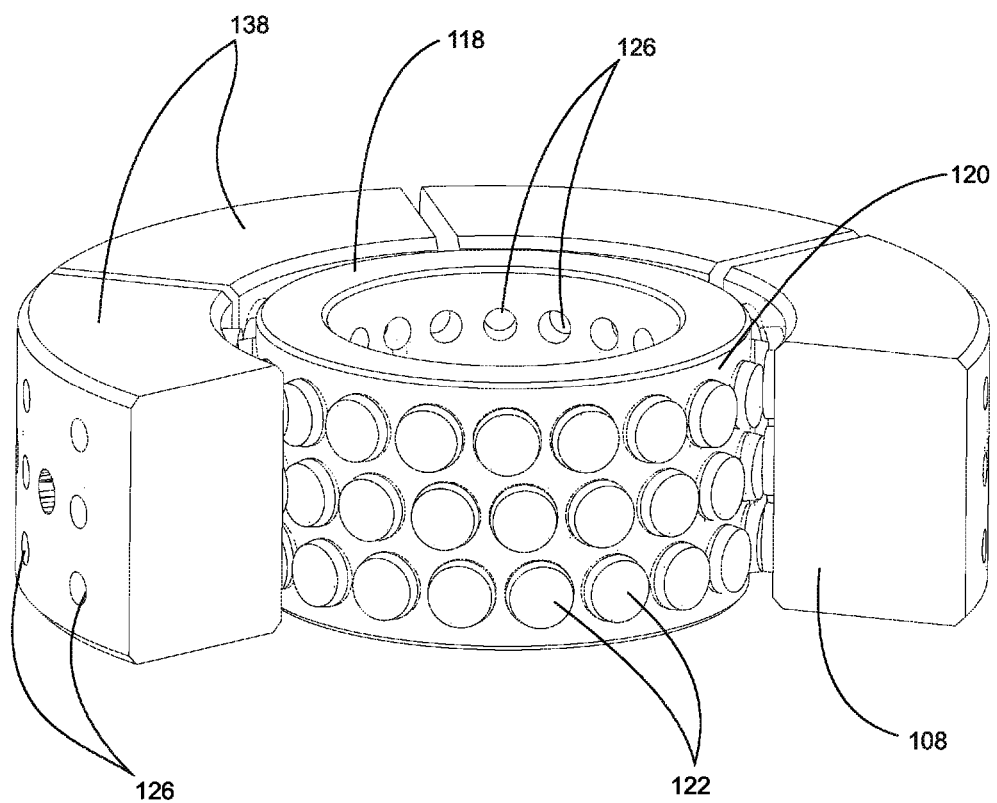
FIG. 9 is a perspective view according to FIG. 8, the remaining PDC buttons from the removed pad segments having been removed for better illustrating the offset PDC's.

Best seen in FIGS. 7-9, the inner and outer bearing surfaces 116,120 support a plurality of bearing surfaces 122 thereon. In embodiments of the invention, the plurality of bearing surfaces 122 are polycrystalline diamond compact (PDC) inserts or buttons which are mounted to the inner and outer bearing surfaces 116,120 of the outer and inner bearing supports 108,118, respectively. The PDC buttons 122 are mounted in at least two axially spaced circumferential rows about the circumference of the outer bearing surface 120 of the inner bearing support 118 and on the inner bearing surface 116 of the outer bearing support 108.

The plurality of PDC buttons 122 on the inner bearing surface 116 are arranged in a circular array about the rotor axis S. The plurality of PDC buttons 122 on the outer bearing surface 120 are arranged in a circular array about the rotor axis S.

As shown in FIGS. 8 and 9, the array of PDC buttons 122 in each of the rows on one of either the inner bearing support 118 or the outer bearing support 108, are circumferentially indexed or offset relative to an axially adjacent row of PDC buttons. The indexed arrangement of the PDC buttons 122 ensures that there is always an inner PDC button 122 engaging an outer PDC button 122. The PDC buttons 122 on the other of the inner bearing support 118 or the outer bearing support 108 can be axially aligned with the adjacent row (FIG. 8), therefore ensuring there is always a circumferential indexing. Further, the arrangement of the PDC buttons 122, as described, permits some axial misalignment of the inner and outer bearing supports 118, 108. Thus, the overall arrangement of the PDC buttons 122 results in a smooth or continuous load transition between PDC buttons 122 as the rotor 14 rotates. This eliminates "cogging" or intermittent loading of the PDC buttons 122.

In an embodiment, the plurality of PDC buttons 122 are provided in two rows on each of the inner and outer bearing surfaces 116, 120. On one of either the inner or the outer bearing surface 116, 120, the plurality of PDC buttons 122 in one of the two rows are circumferentially indexed relative to the other of the two rows. The plurality of PDC buttons 122, in the two rows on the other of the inner or outer bearing surface 116, 120, are axially aligned.

In an embodiment, the plurality of the plurality of PDC buttons 122 are provided in three rows on each of the inner and outer bearing surfaces 116, 120. On one of either the inner or the outer bearing surface 116, 120, the plurality of PDC buttons 122 in the three rows are circumferentially indexed relative to the other of the three rows. The plurality of PDC buttons 122, in the three rows on the other of the inner or outer bearing surface 116, 120, are axially aligned.

Having reference to FIGS. 6 through 10B, and in embodiments of the invention, the plurality of PDC buttons 122 are installed or affixed to the bearing surfaces 116, 120, such as by being press fit into bores 124 formed therein. Pilot holes 126 extend from the bores 124 through the outer bearing support 108 and the inner bearing support 118 to permit air to be expelled therefrom as the PDC buttons 122 are pressed into the bores 124. Alternatively, the PDC buttons 122 can be affixed in the bores 124 in the outer and inner bearing supports 108,118 by brazing or use of adhesives, as is understood by those of skill in the art.

As shown in FIGS. 4, 5 and 7-9, the outer bearing support 108 further comprises a plurality of circumferentially arranged arcuate pad segments 138, each of which has an inner surface 140 for forming the inner bearing surface 116. The inner surfaces 140 support the radially inwardly oriented PDC buttons 122 for engagement with the radially outwardly oriented PDC buttons 122 on the inner bearing support 118. The arcuate pad segments 138 are supported such as using fasteners, into a bore 142 of an outer support ring 144 for forming the outer bearing support 108. Mounting holes 146 enable mounting of the arcuate pad segments 140 to the outer support ring 144. The outer support ring 144 has the convex outer surface 112.

Figure 4:
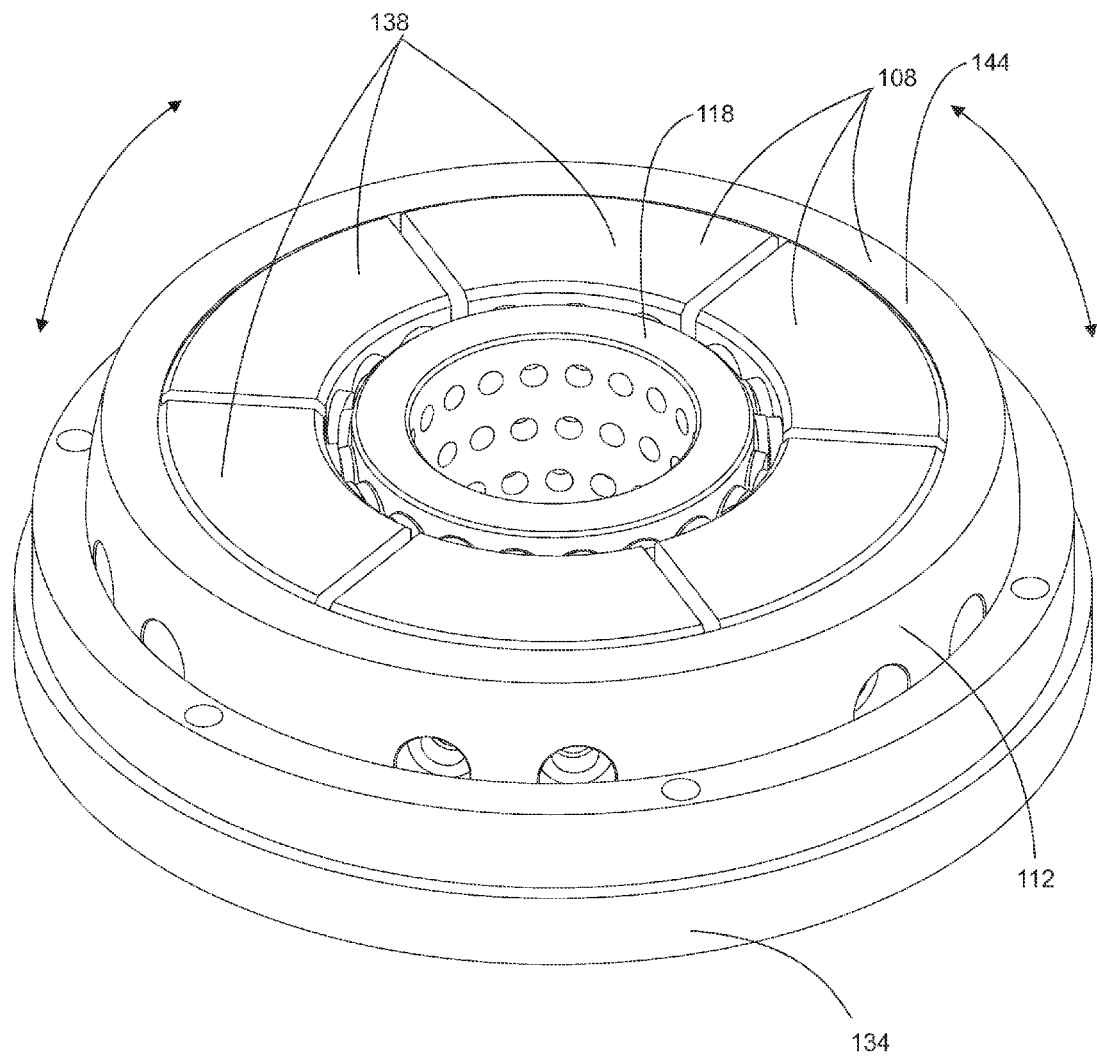
FIG. 4 is a perspective view of the bearing assembly according to FIG. 3, an upper portion of the axial, split bearing housing having been removed for clarity of a convex outer convex surface of a spherical joint formed between the bearing housing and the outer bearing support and illustrating angular movement of the spherical joint with arrows.
Figure 6:
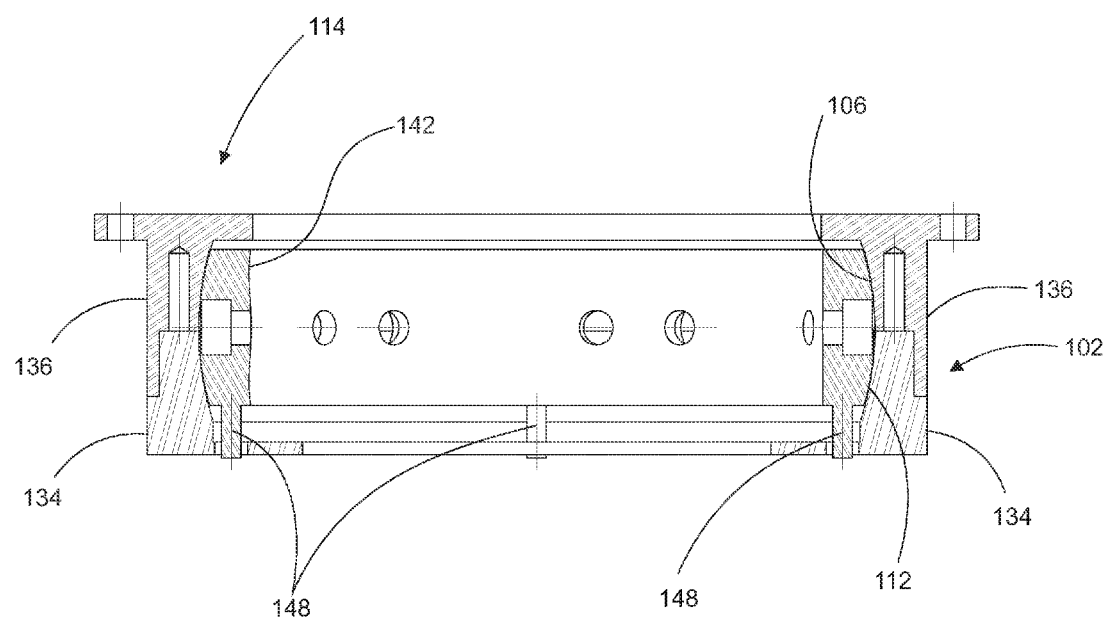
FIG. 6 is a cross-sectional view of the bearing assembly and the assembled axial, split bearing housing according to FIG. 3.

As shown in FIGS. 4 and 6, the bearing housing 102 is an axial split bearing housing comprising a lower bearing housing 134 and an upper bearing housing 136 for ease of installation of the support ring 144.

As shown in arrows in FIG. 4, the spherical interface or joint 114 between the outer support ring 144 and the stationary housing 102 permits the bearing assembly 100 to angularly self-align to the turbine rotor 14, such as when the turbine rotor 14 and the support structure 12 deflect under applied loading. In other words, when the axis of the rotor S deflects from the axis of the housing X, the bearing assembly 100 tilts or moves angularly to align to the rotor axis S.

Figure 5:
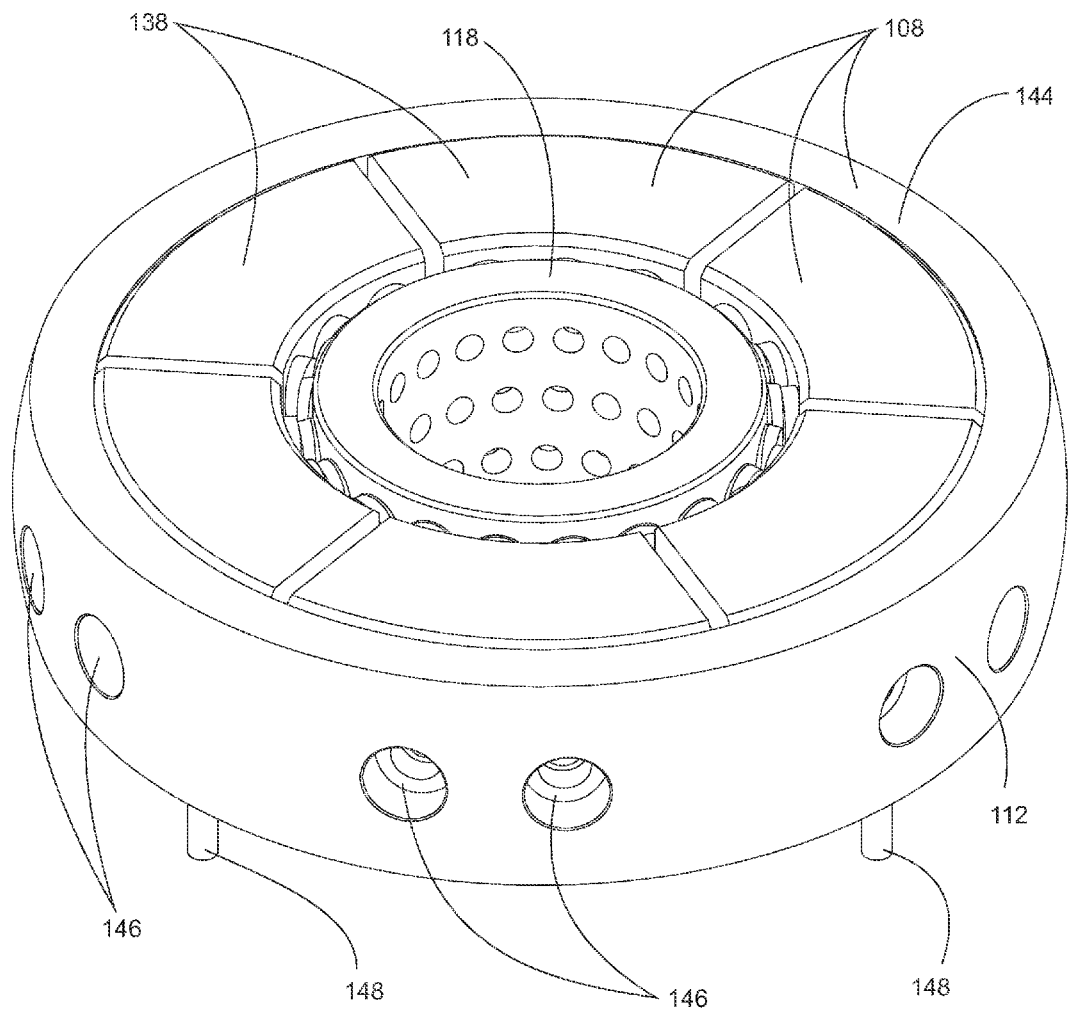
FIG. 5 is a perspective view of the bearing assembly of FIG. 4, the remaining lower portion of the axial, split bearing housing having been removed and illustrating anti-rotation rods which lock the outer bearing support to the bearing housing for preventing reactive rotation.

As shown in FIGS. 5 and 6, means, such as a plurality of anti-rotation rods or pins 148, engage between the outer support ring 144 and the stationary housing 102 to restrain reactive rotation of the outer bearing support 108 with the inner bearing support 118 and rotor 14. The plurality of anti-rotation pins 148 are movably supported by the stationary housing 102 to permit angular or tilting movement of the bearing assembly 100 while restraining rotational movement of the outer bearing support 108.

Figure 10A:
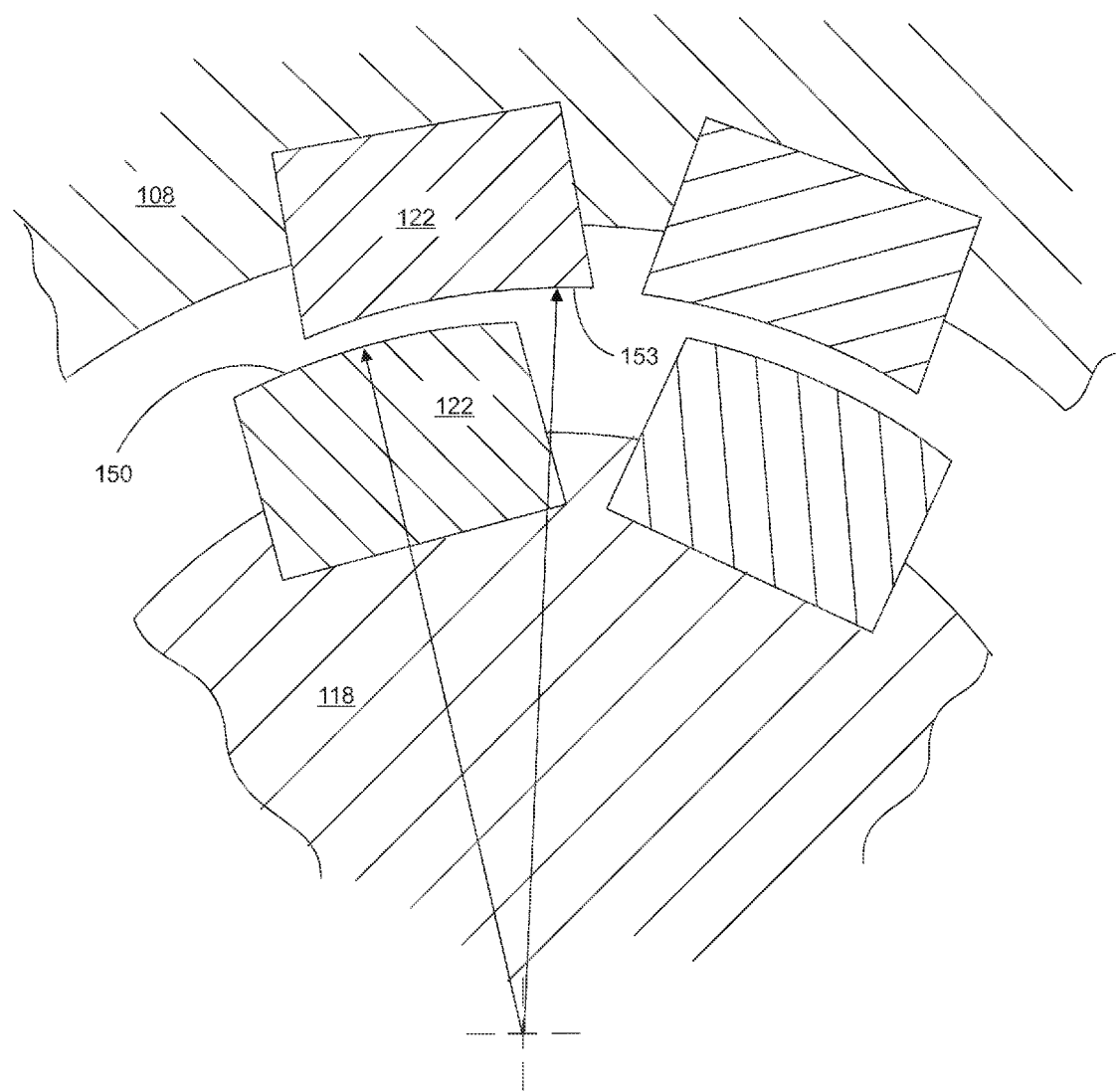
FIG. 10A is a schematic representation of opposing PDC bearing faces of the bearing surfaces, the bearing faces on the rotating inner bearing support being manufactured to have a cylindrical face and the opposing bearing face on the outer bearing support having been formed, or worn during use, to a cylindrical face.
Figure 10B:
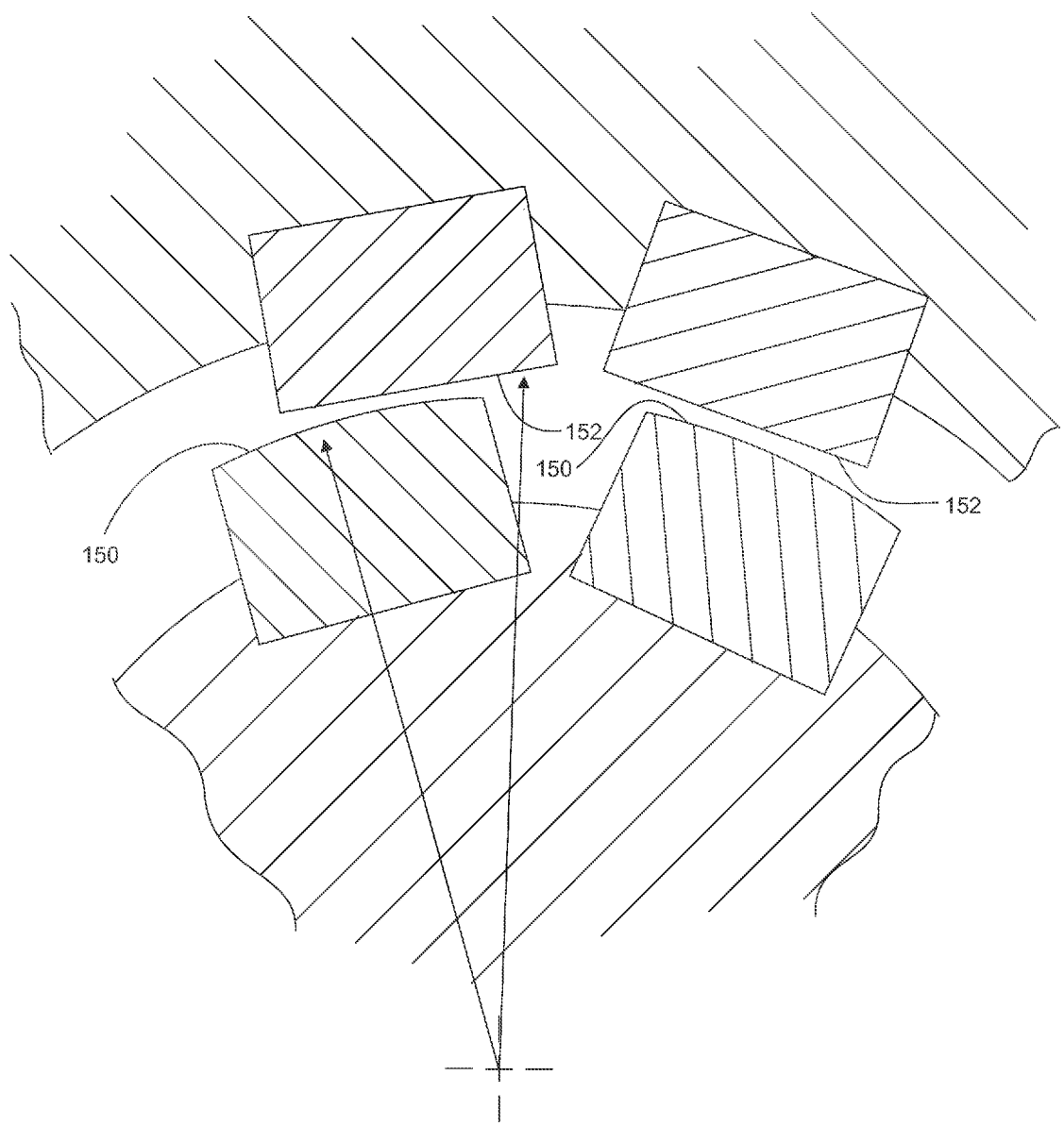
FIG. 10B is a schematic according to FIG. 10A, the flat bearing faces on the outer bearing support having not yet worn to a cylindrical face.

As shown in FIG. 10A, a bearing face 150 of each of the PDC buttons 122 in the array of PDC buttons 122 on the inner bearing support 118 are formed with a cylindrical profile. Each bearing face 150 forms an arc or segment of an overall cylindrical profile about the rotor axis S. Profiling at least the bearing faces 150 of the PDC buttons 122 on the rotating inner bearing support 118 acts to avoid button lip-to-lip contact as the PDC button 122 on the inner bearing support 118 rotates in an arc to engage the PDC button 122 on the stationary outer bearing support 108.

Over time, a non-profiled face 152 (FIG. 10B) of the PDC buttons 122 on the outer bearing support 108 will wear to a cylindrical profile 153 as the opposing bearing faces 150,152 engage one another. Alternatively the PDC buttons 122 on the outer bearing support may be formed to the cylindrical profile. The cylindrical profile may be ground.

Use of a plurality of PDC buttons 122 as described herein permits reduced loading and results in bearing surfaces 116, 120 which have a long life.

Test Apparatus

Having reference to FIGS. 11-14, the components are illustrated for a radial bearing assembly 200 utilized as a test apparatus for simulating radial loads. The loads are simulated using hydraulics.

The bearing assembly 200 comprises a plurality of PDC inserts or buttons 202 as bearing surfaces 203. Peripheral arrangements of PDC buttons 202 are oriented radially outwardly on an inner ring 204 to face PDC buttons 202 oriented radially inwardly on an outer ring 206. The outer ring 206 comprises one or more segments 208 supported in a housing 210. The inner ring 204 and outer ring 206 are concentric, the inner ring 204 rotation relative to the outer ring 206. The PDC buttons 202 are supported in the inner and outer rings 204,206 with their bearing faces in rotational engagement. As the PDC buttons 202 form a discontinuous bearing surface, continuous radial support is provided by providing at least two axially-spaced and circumferential rows of PDC buttons 202. On one of either the inner or outer ring 204,206, the PDC buttons 202 of one row are misaligned from the PDC buttons 202 in the other row or rows. Thus, there is always a radial bearing surface for substantially 360 degrees of the rotation.

Figure 11:
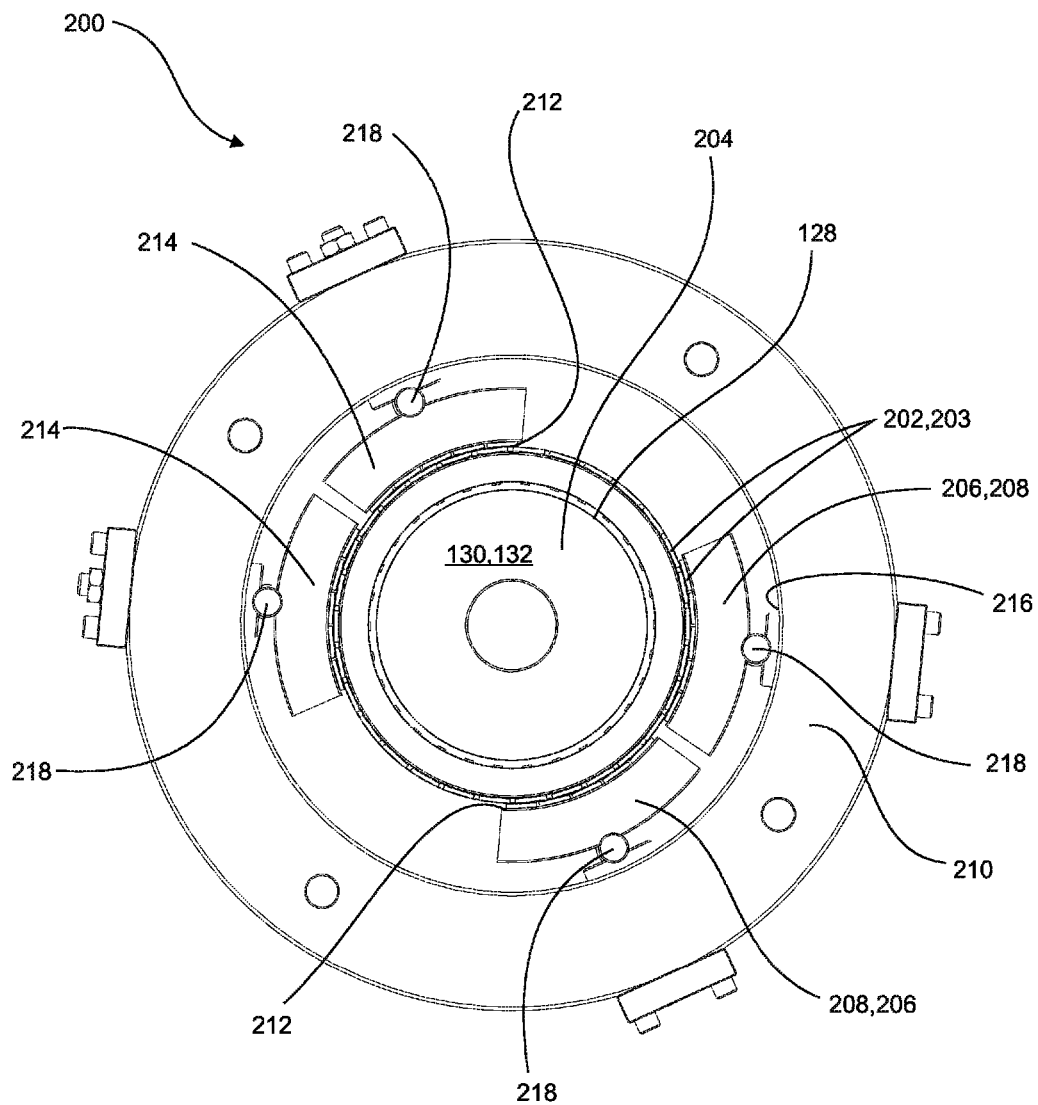
FIG. 11 is a plan view of a bearing assembly according to an embodiment of the invention, arranged in a test arrangement for simulating radial loads thereon.
Figure 12:
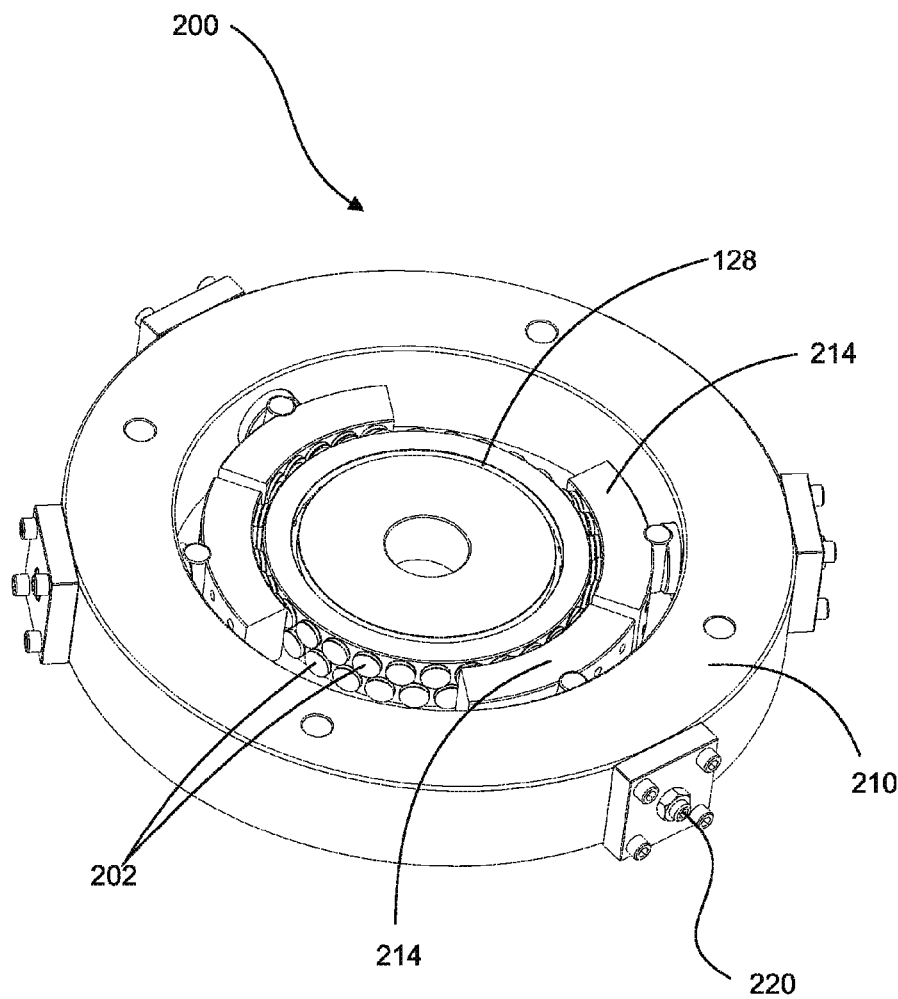
FIG. 12 is a perspective view of the test arrangement according to FIG. 11, illustrating bearing surfaces on the inner bearing support and the outer bearing support.
Figure 13:
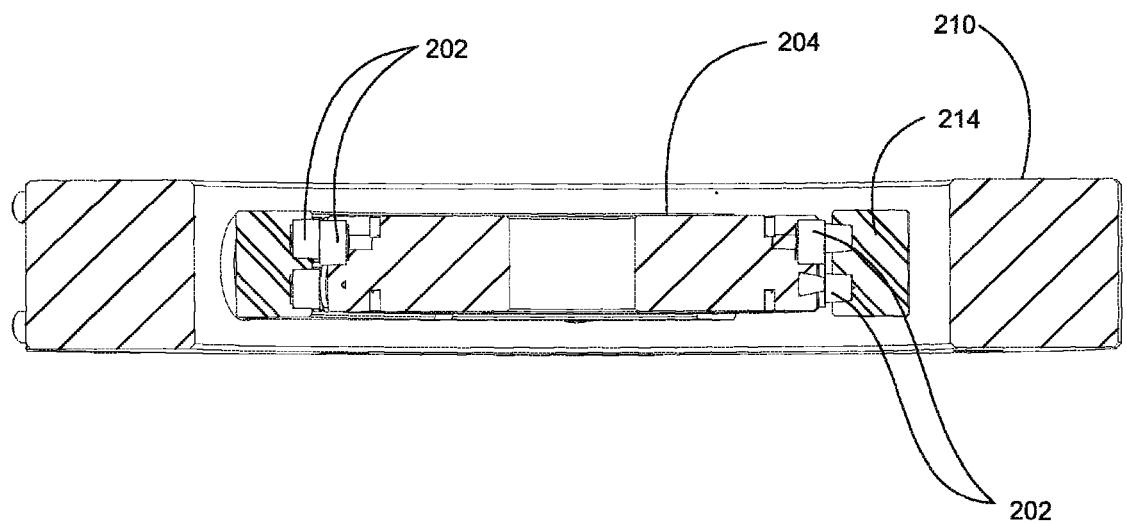
FIG. 13 is a cross-sectional view of the test arrangement according to FIG. 11.
Figure 14:
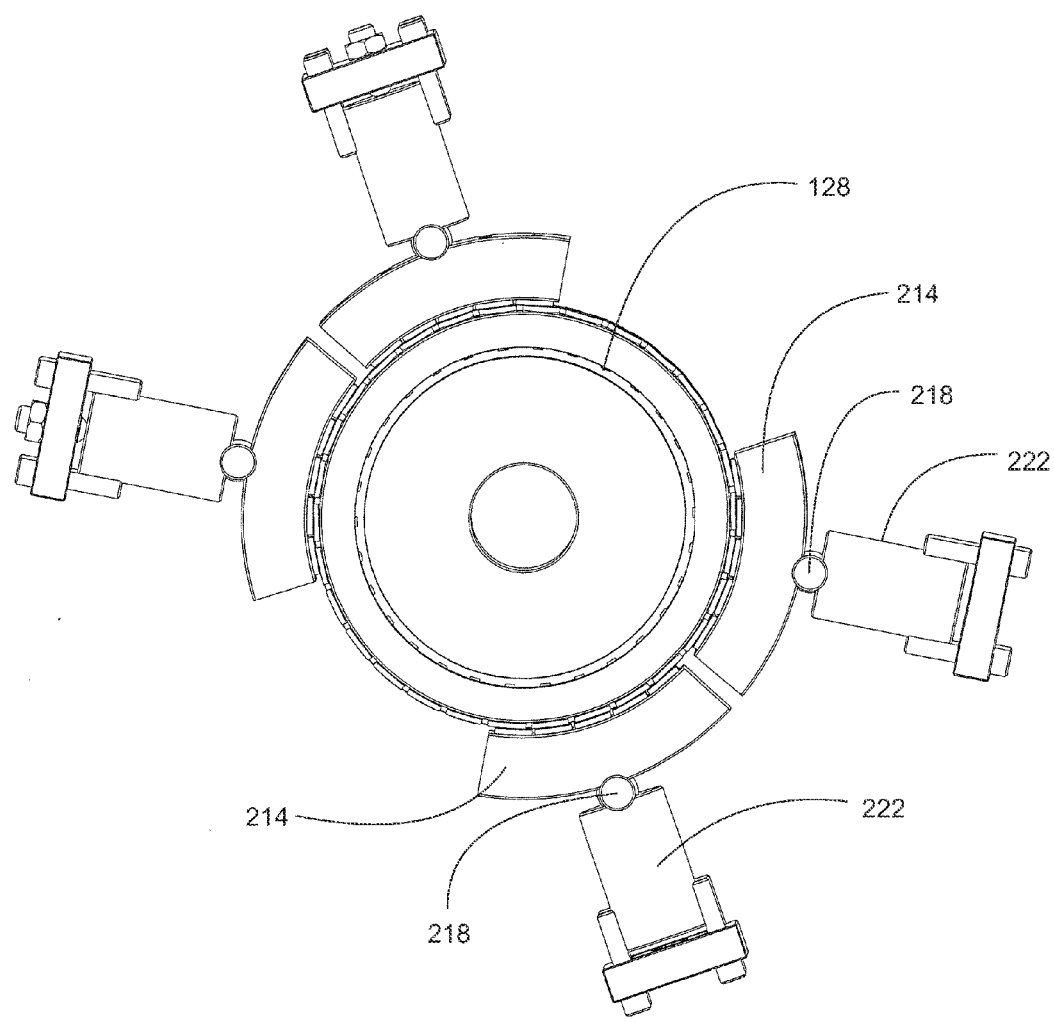
FIG. 14 is a plan view of the test arrangement according to FIG. 11, the bearing housing being removed for clarity and illustrating two or more tilt pads for supporting the bearing surfaces on the outer bearing support.

Having reference to FIGS. 11, 12, and 14, and in an embodiment of the invention, such as for imposing variable radial loads or adjusting the concentricity of the inner and outer rings 204,206 and for ease of inserting the PDC buttons 202, bearing surfaces 203 on an inner face 212 of the outer ring 206 are supported on two or more, spaced apart, arcuate tilt pads 214. The arcuate tilt pads 214 are the segments 208 for forming the outer ring 206 and are positioned about an inner circumference or face 216 of the housing 210. Each of the two or more arcuate tilt pads 214 is tiltably supported about the inner face 216 of the housing 210, such as by a spherical bearing roller 218, for alignment of the bearing surfaces 203 on the tilt pads 214 with the bearing surfaces 203 on the inner ring 204. In embodiments of the invention the tilt pads 214 are evenly arranged about the inner circumference 216 of the outer ring 206 to evenly distribute radial loading. In embodiments having two tilt pads 214, the tilt pads 214 are spaced to oppose one another. In embodiments where there are greater than two tilt pads 214, the tilt pads 214 may be evenly spaced about the inner circumference 216 or may be grouped to oppose tilt pads 214 on an opposite side of the inner circumference 216.

In embodiments of the invention best seen in FIGS. 11, 12 and 14 the tilt pads 214 bear radially against the housing 210. One or more of the tilt pads 214 may be mounted using a set screw 220 through the housing 210 to permit manual centering thereof. In an embodiment best suited for testing the bearing assembly 200 (FIG. 14), at least the remaining tilt pads 214 may be mounted to float hydraulically using hydraulics 222, the application of hydraulic loading being suited to simulate radial loading of the bearing assembly 200. In embodiments best suited for commercial use, all of the tilt pads 214 could also be mounted using set screws 220 or other such fasteners.

As shown in FIGS. 11, 12 and 14, concentric grooves 128 are formed about an upper and a lower surface 130,132 of the inner bearing support 118 and which are fluidly connected to bores 124 in which the PDC buttons are inserted. Air is expelled from the bores 124 into the grooves 128 as the PDC buttons 122 are inserted therein.

What is claimed is:

1. A self-aligning radial bearing assembly for immersion in a fluid environment comprising:
   a stationary bearing housing having a bore formed therethrough, a housing axis and an inner concave surface, the bearing housing being adapted for mounting to a stationary support;
   an outer bearing support housed within the bore of the stationary housing, the outer bearing support having an outer convex surface, an inner bearing surface and a bore formed therethrough, the outer convex surface co-operating with the inner concave surface of the stationary housing for forming a spherical joint therebetween, the outer bearing support being tiltable at the spherical joint, the inner bearing surface comprising a plurality of radially, inwardly extending polycrystalline diamond compact (PDC) buttons supported therein; and
   an inner bearing support, radially and rotationally supported within the bore of the outer bearing support and having an outer bearing surface and a bore formed therethrough, the bore having a rotor axis, being adapted for receiving a rotor extending therethrough and co-rotation therewith, the outer bearing surface comprising a plurality of radially outwardly extending PDC buttons supported therein,
   wherein the plurality of PDC buttons are arranged in at least two, axially-spaced, circumferential rows on each of the inner bearing surface and the outer bearing surface; and
   wherein the plurality of PDC buttons of the at least two rows on either of the inner bearing surface or the outer bearing surface are circumferentially indexed relative to one another so as to ensure there is always an inner PDC button engaging an outer PDC button and the plurality of PDC buttons of the at least two rows on the other of the inner bearing surface or the outer bearing surface are aligned axially for providing continuous radial support and load transition between the inner bearing surface and the outer bearing surface.

2. The bearing assembly of claim 1, wherein bearing faces of at least the radially outwardly extending PDC buttons have a cylindrical profile having a center at the rotor axis.

3. The bearing assembly of claim 1, wherein the at least two, axially-spaced, circumferential rows are three, axially-spaced, circumferential rows on each of the inner bearing surface and the outer bearing surface; and wherein the plurality of PDC buttons of the three rows on either of the inner bearing surface or the outer bearing surface are circumferentially indexed relative to one another and the plurality of PDC buttons of the three rows on the other of the inner bearing surface or the outer bearing surface are aligned axially for providing the continuous radial support and load transition between the inner bearing surface and the outer bearing surface.

4. The bearing assembly of claim 1, wherein the stationary housing is an axial split bearing housing comprising a first bearing housing and a second bearing housing for installation of the outer bearing support.

5. The bearing assembly of claim 1, further comprising anti-rotation pins for engaging between the stationary housing and the outer bearing support for restraining reactive rotational movement of the outer bearing support while permitting tilting of the outer bearing support in the spherical joint.

6. The bearing assembly of claim 1, wherein the outer bearing support further comprises a plurality of circumferentially arranged arcuate pad segments supported within an outer support ring, each of the plurality of segments having an inner surface for forming the inner bearing surface, the outer support ring having the outer convex surface.

7. A hydroelectric turbine system comprising:
   a stationary turbine support structure positioned in a flow of power fluid;
   a turbine positioned within the flow of power fluid for rotation thereby;
   a generator above a surface of the power fluid;
   a rotatable rotor connecting between the generator at an upper end and the turbine, supported therealong, the rotor having a rotor axis; and
   a bearing assembly connected between a lower end of the rotor and the stationary turbine support structure and immersed within the power fluid, the bearing assembly comprising the self-aligning bearing assembly of claim 1.

8. The hydroelectric turbine system of claim 7, wherein bearing faces of at least the radially outwardly extending PDC buttons have a cylindrical profile having a center at the rotor axis.

9. The hydroelectric turbine system of claim 7, wherein the stationary housing is an axial split bearing housing comprising a first bearing housing and a second bearing housing for installation of the outer bearing support.

10. The hydroelectric turbine system of claim 7, further comprising anti-rotation pins for engaging between the stationary housing and the outer bearing support for restraining reactive rotational movement of the outer bearing support while permitting tilting of the outer bearing support in the spherical joint.

11. The hydroelectric turbine system of claim 7, wherein the outer bearing support further comprises a plurality of circumferentially arranged arcuate pad segments supported within an outer support ring, each of the plurality of segments having an inner surface for forming the inner bearing surface, the outer support ring having the outer convex surface.

12. A self-aligning radial bearing assembly for immersion in a fluid environment, comprising:
   a stationary bearing housing having a bore formed therethrough, a housing axis and an inner concave surface, the bearing housing being adapted for mounting to a stationary support;
   an outer bearing support housed within the bore of the stationary housing, the outer bearing support comprising a plurality of circumferentially arranged arcuate pad segments supported within an outer support ring having an outer convex surface, an inner bearing surface and a bore formed therethrough, the outer convex surface co-operating with the inner concave surface of the stationary housing for forming a spherical joint therebetween, the inner bearing surface comprising a plurality of radially, inwardly extending polycrystalline diamond compact (PDC) buttons supported therein; and an inner bearing support, radially and rotationally supported within the bore of the outer bearing support and having an outer bearing surface and a bore formed therethrough, the bore having a rotor axis, being adapted for receiving a rotor extending therethrough and co-rotation therewith, the outer bearing surface comprising a plurality of radially outwardly extending PDC buttons supported therein, wherein the outer bearing support is tiltable at the spherical joint, and the inner bearing surfaces and the outer bearing surfaces are immersed in the fluid environment.

13. The bearing assembly of claim 12, wherein bearing faces of at least the radially outwardly extending PDC buttons have a cylindrical profile having a center at the rotor axis.

14. The bearing assembly of claim 12, wherein the plurality of PDC buttons on each of the inner bearing surface and the outer bearing surface are arranged in at least two, axially-spaced, circumferential rows, and the plurality of PDC buttons of one row, on one of either the inner bearing surface or the outer bearing surface, are circumferentially indexed from the plurality of PDC buttons in the other of the at least two rows, for providing continuous radial support and load transition between the inner bearing surface and the outer bearing surface.

15. The bearing assembly of claim 12, wherein the plurality of PDC buttons are arranged in two, axially-spaced, circumferential rows on each of the inner bearing surface and the outer bearing surface, and the plurality of PDC buttons of the two rows on either of the inner bearing surface or the outer bearing surface are circumferentially indexed relative to one another and the plurality of PDC buttons of the two rows on the other of the inner bearing surface or the outer bearing surface are aligned axially for providing continuous radial support and load transition between the inner bearing surface and the outer bearing surface.

16. The bearing assembly of claim 12, wherein the plurality of PDC buttons are arranged in three, axially-spaced, circumferential rows on each of the inner bearing surface and the outer bearing surface, and the plurality of PDC buttons of the three rows on either of the inner bearing surface or the outer bearing surface are circumferentially indexed relative to one another and the plurality of PDC buttons of the three rows on the other of the inner bearing surface or the outer bearing surface are aligned axially for providing continuous radial support and load transition between the inner bearing surface and the outer bearing surface.

17. The bearing assembly of claim 12, wherein the stationary housing is an axial split bearing housing comprising a first bearing housing and a second bearing housing for installation of the outer bearing support.

18. The bearing assembly of claim 12, further comprising anti-rotation pins for engaging between the stationary housing and the outer bearing support for restraining reactive rotational movement of the outer bearing support while permitting tilting of the outer bearing support in the spherical joint.

* * * * *